(12) United States Patent
Toida et al.

(10) Patent No.: US 9,899,692 B2
(45) Date of Patent: Feb. 20, 2018

(54) FUEL CELL SYSTEM AND CONTROL METHOD OF FUEL CELL SYSTEM

(71) Applicant: TOYOTA JIDOSHA KABUSHIKI KAISHA, Toyota-shi, Aichi-ken (JP)

(72) Inventors: Masashi Toida, Nogoya (JP); Yoshiaki Naganuma, Toyota (JP); Tomohiro Ogawa, Toyota (JP); Tsuyoshi Maruo, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 96 days.

(21) Appl. No.: 14/933,410

(22) Filed: Nov. 5, 2015

(65) Prior Publication Data

US 2016/0141685 A1 May 19, 2016

(30) Foreign Application Priority Data

Nov. 14, 2014 (JP) ................................ 2014-232071

(51) Int. Cl.

| H01M 8/00 | (2016.01) |
| H01M 8/04746 | (2016.01) |
| H01M 8/0432 | (2016.01) |
| H01M 8/04492 | (2016.01) |
| H01M 8/04302 | (2016.01) |

(52) U.S. Cl.
CPC ..... *H01M 8/04761* (2013.01); *H01M 8/0432* (2013.01); *H01M 8/04302* (2016.02); *H01M 8/04514* (2013.01); *H01M 8/04522* (2013.01)

(58) Field of Classification Search
CPC ........... H01M 8/04761; H01M 8/0432; H01M 8/04302; H01M 8/04522; H01M 8/04514
See application file for complete search history.

(56) References Cited

U.S. PATENT DOCUMENTS

2013/0189597 A1\* 7/2013 Kim .................. H01M 8/04037
429/415

FOREIGN PATENT DOCUMENTS

| EP | 1 203 418 | 11/2009 |
| JP | 2006-134695 A | 5/2006 |
| JP | 2006-164731 A | 6/2006 |
| JP | 2009-104955 A | 5/2009 |
| JP | 2010-282823 | 12/2010 |
| WO | WO 00/74162 A1 | 12/2000 |

\* cited by examiner

*Primary Examiner* — Mark F. Huff
*Assistant Examiner* — Monique M Wills
(74) *Attorney, Agent, or Firm* — Finnegan, Henderson, Farabow, Garrett & Dunner, LLP

(57) ABSTRACT

An objection is to provide a technology by which a decline in the starting performance of a fuel cell system may be controlled in a low-temperature environment. A control method of a fuel cell system includes a temperature acquisition step of acquiring a temperature of the fuel cell at start-up of the fuel cell; and an exhaust gas control step of restricting, when the temperature of the fuel cell is below a predetermined value, a flow rate of an exhaust gas flowing into a flow path configuring portion that configures at least a part of a flow path of the exhaust gas of the fuel cell as compared to the flow rate of the exhaust gas flowing into the flow path configuring portion when the temperature of the fuel cell is equal to or less than the predetermined value.

7 Claims, 7 Drawing Sheets

FUEL CELL SYSTEM AND CONTROL METHOD OF FUEL CELL SYSTEM

CROSS-REFERENCE TO RELATED APPLICATION

The present application claims the priority based on the Japanese Patent Application No. (JP) 2014-232071 filed on Nov. 14, 2014, the disclosure of which is incorporated by reference herein in its entirety.

BACKGROUND

Field

The present invention relates to a fuel cell system and a control method of a fuel cell system.

Related Art

A polymer electrolyte fuel cell, hereinafter simply called a "fuel cell", discharges a large amount of moisture that is generated internally as a result of a power generation reaction. Regarding to a fuel cell system, various technologies for preventing a decline in the starting performance of the fuel cell system due to freezing of moisture remaining in the fuel cell system in a low-temperature environment, such as below ice point, are proposed as disclosed in JP2010-282823A for example.

SUMMARY

According to the technology disclosed in the JP2010-282823A, the decline in the starting performance of a system due to freezing of residual moisture is prevented by determining the moisture content inside a fuel cell, and then switching the conditions of scavenging the fuel cell, and the start-up mode of the fuel cell below the ice point depending on the moisture content. However, the present inventors figured out that in a low-temperature environment, the freezing of not only the moisture remaining in the fuel cell before start-up, but also the moisture generated in the fuel cell during start-up could result in a decline in the starting performance of the system. There is still room for improvement in the technology for preventing a decline in the starting performance of the fuel cell system in a low-temperature environment.

In order to solve at least part of the problem in a fuel cell system described above, the present invention may be implemented in the aspects described below.

(1) According to a first aspect of the present invention, a control method of a fuel cell system is provided. The control method may include a temperature acquisition step and an exhaust gas control step. The temperature acquisition step may be a step of acquiring a temperature of the fuel cell at star-up of the fuel cell. The exhaust gas control step may be a step of restricting, when the temperature of the fuel cell is below a predetermined value, a flow rate of an exhaust gas flowing into a flow path configuring portion that configures at least a part of a flow path of the exhaust gas of the fuel cell as compared to the flow rate of the exhaust gas flowing into the flow path configuring portion when the temperature of the fuel cell is equal to or less than the predetermined value. According to the control method of a fuel cell system in this aspect, the freezing of the flow path configuring portion by the moisture vapor included in the exhaust gas is suppressed, because the flow rate of the exhaust gas flowing into a flow path configuring portion in a low-temperature environment is restricted. Therefore, the decline in the starting performance of the fuel cell system in a low-temperature environment is suppressed.

(2) In the control method of the above aspect, the exhaust gas control step may include a step of setting the flow rate of the exhaust gas a lower value as the temperature of the fuel cell is lower when the flow rate of the exhaust gas is restricted. According to the control method of this aspect, the freezing of the flow path configuring portion by the moisture vapor included in the exhaust gas is further prevented.

(3) In the control method of the above aspect, the exhaust gas control step may include a step of acquiring a measured value of the temperature of the fuel cell, acquiring a permissible value of the flow rate of the exhaust gas for the measured value of the temperature of the fuel cell on the basis of a relationship, which is prepared in advance, between the temperature of the fuel cell and the permissible value of the flow rate of the exhaust gas, and setting the flow rate of the exhaust gas to the permissible value so as to restrict the flow rate of the exhaust gas, and the permissible value may be a value that is predetermined on the basis of an amount of moisture vapor included in the exhaust gas at the temperature of the fuel cell. According to the control method of this aspect, the freezing of the flow path configuring portion by the moisture vapor included in the exhaust gas is further prevented.

(4) The above aspect of the control method may further comprise a flow path temperature acquisition step of acquiring a value expressing the temperature of the flow path configuring portion; and a restriction cancellation step of canceling the restriction on the flow rate of the exhaust gas when the value expressing the temperature of the flow path configuring portion becomes more than a predetermined value. The flow path temperature acquisition step and the restriction cancellation step may be executed after the flow rate of the exhaust gas is restricted. According to the control method of this aspect, the restriction on the flow rate of the exhaust gas may be cancelled when the temperature of the flow path configuring portion reaches a value where the possibility of freezing is less, and therefore, the decline in system efficiency due to the restriction on the flow rate of the exhaust gas is suppressed.

(5) In the control method of the above aspect, the flow path temperature acquisition step may include a step of acquiring the value expressing the temperature of the flow path configuring portion on the basis of the flow rate of the exhaust gas and the temperature of the fuel cell. According to the control method of this aspect, a direct measurement of the temperature of the flow path configuring portion may be omitted, which proves to be effective.

(6) In the control method of the above aspect, the flow path configuring portion may include a circulation pump for circulating the exhaust gas to the fuel cell, and the exhaust gas control step may include a step of controlling the flow rate of the exhaust gas by the rotation speed of the circulation pump. According to the control method of this aspect, the decline in the starting performance of the fuel cell system due to freezing of the circulation pump in a low-temperature environment is suppressed.

(7) According to a second aspect of the present invention, a fuel cell system is provided. The fuel cell system may include a fuel cell, a temperature acquirer, an exhaust gas processing unit, and a controller. The temperature acquirer may acquire a temperature of the fuel cell. The exhaust gas processing unit may include a flow path configuring portion that configures at least a part of the flow path of the exhaust gas of the fuel cell. The controller may control the exhaust gas processing unit. The controller may execute a flow restriction control that restricts, when the temperature of the fuel cell is below a predetermined value at start-up of the fuel cell, a flow rate of the exhaust gas flowing into the flow path configuring portion, as compared to the flow rate of the exhaust gas flowing into the flow path configuring portion when the temperature of the fuel cell is equal to or less than the predetermined value. According to the fuel cell system of this aspect, the freezing of the flow path configuring portion by the moisture vapor included in the exhaust gas is suppressed, because the flow of the exhaust gas flowing into the flow path configuring portion in a low-temperature environment may be restricted. Therefore, the decline in the starting performance of the fuel cell system in a low-temperature environment is suppressed.

(8) In the fuel cell system of the above aspect, the controller may set the flow rate of the exhaust gas to a lower value as the temperature of the fuel cell is lower when the flow rate of the exhaust gas is restricted in the flow restriction control. According to the fuel cell system of this aspect, the freezing of the flow path configuring portion by the moisture vapor included in the exhaust gas is further suppressed.

(9) In the fuel cell system of the above aspect, during the flow restriction and control, the controller acquires a measured value of the temperature of the fuel cell, acquires a permissible value of the flow rate of the exhaust gas for the measured value of the temperature of the fuel cell on the basis of a relationship, which is prepared in advance, between the temperature of the fuel cell and the permissible value, and sets the flow rate of the exhaust gas to the permissible value; and wherein the permissible value is a value that is decided on the basis of the amount of moisture vapor included in the exhaust gas at the temperature of the fuel cell. According to the fuel cell system of this aspect, the freezing of the flow path configuring portion by the moisture vapor included in the exhaust gas is further suppressed.

(10) The fuel cell system of the above aspect may further include a flow path temperature acquirer acquires a value expressing the temperature of the flow path configuring portion and the controller may cancel the restriction on the flow rate of the exhaust gas, when the value expressing the temperature of the flow path configuring portion becomes more than a predetermined value during the flow restriction control. According to the fuel cell system of this aspect, the restriction on the flow rate of the exhaust gas is cancelled when the temperature of the flow path configuring portion reaches a value where the possibility of freezing is less, and therefore, the decline in system efficiency due to a restriction on the flow rate of the exhaust gas is suppressed.

(11) In the fuel cell system of the above aspect, the flow path temperature acquirer may acquire the value expressing the temperature of the flow path configuring portion on the basis of the flow rate of the exhaust gas and the temperature of the fuel cell. According to the fuel cell system having such a form, a direct measurement of the temperature of the flow path configuring portion may be omitted, which proves to be effective.

(12) In the fuel cell system of the above aspect, the exhaust gas processing unit may include a circulation pump as the flow path configuring portion and circulates the exhaust gas to the fuel cell by the circulation pump; and the controller may control the flow rate of the exhaust gas by the rotation speed of the circulation pump. According to the fuel cell system of this aspect, the decline in the starting performance of the fuel cell system due to freezing of the circulation pump in a low-temperature environment is suppressed.

Not all of the plurality of components of each of the above-described aspects of the present invention are necessary, and in order to resolve some or all of the above-described issues, or to realize some or all of the above-described effects, some of the plurality of components may be appropriately changed, deleted, substituted with other new components, or some of the restricted contents may be deleted. Moreover, in order to resolve some or all of the above-described issues, or to realize some or all of the above-described effects, some or all of the technical characteristics described in one of the embodiments of the present invention may be combined with some or all of the technical characteristics included in the above-described other aspects of the present invention to result in an independent form of the present invention.

The present invention may also be implemented through various embodiment other than a control method of a fuel cell system, and a fuel cell system. For example, the present invention may be implemented in embodiments such as a mobile object on which a fuel cell system is mounted, a method of starting a fuel cell system, a method of controlling a circulation pump, a method of processing an exhaust gas of a fuel cell, a computer program for implementing such methods, and a non-transitory recording medium in which such a computer program is recorded.

DESCRIPTION OF EMBODIMENT

A. Embodiment

Figure 1:
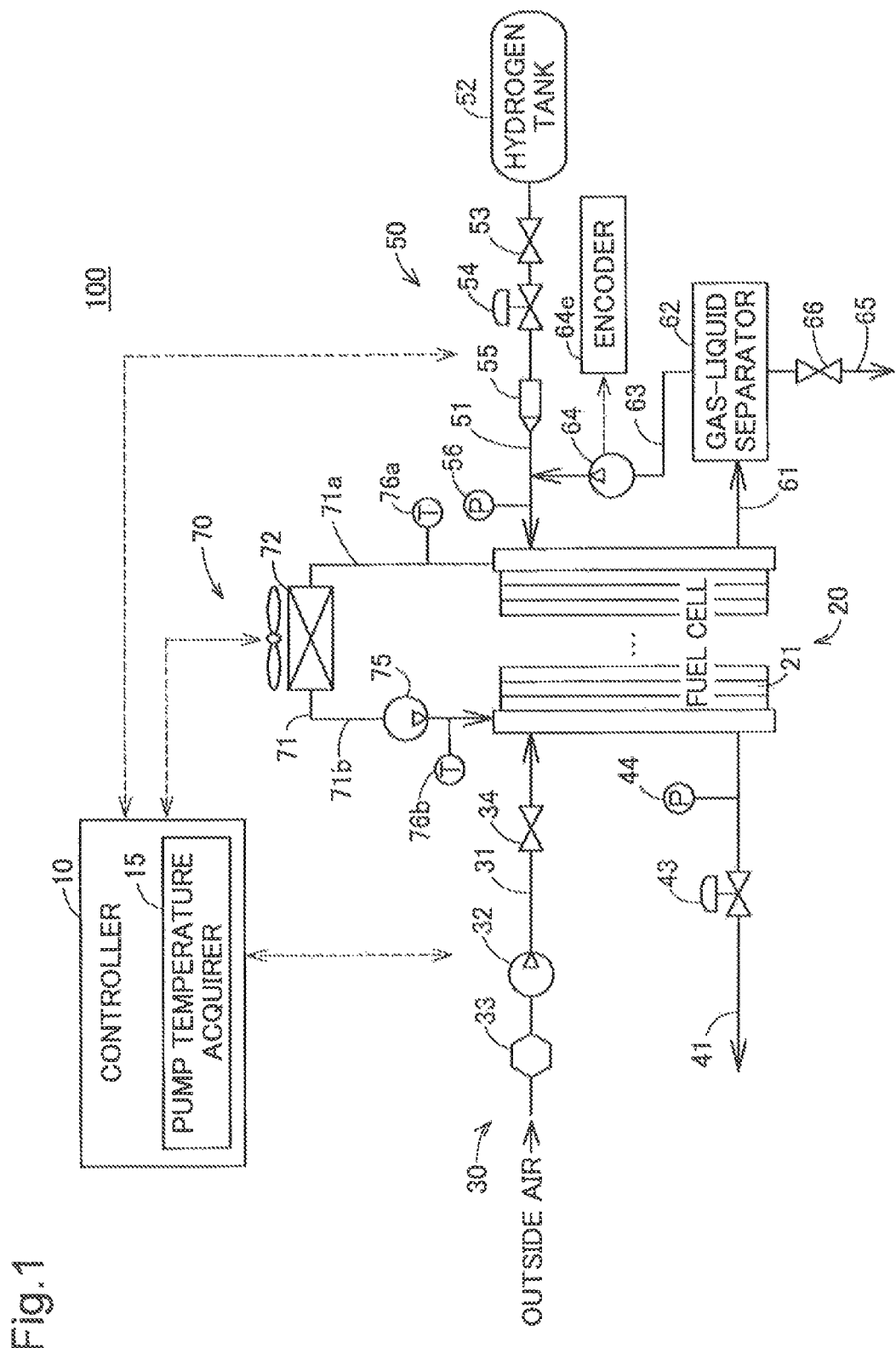
FIG. 1 is a schematic diagram showing a configuration of a fuel cell system.

A1. Configuration of a Fuel Cell System:

FIG. 1 is a schematic diagram showing a configuration of a fuel cell system 100 according to a first embodiment of the present invention. The fuel cell system 100 is mounted on a fuel cell vehicle, and outputs the power to be used as driving power in accordance with a request from a driver. The fuel cell system 100 includes a controller 10, a fuel cell 20, a cathode gas supply and discharge unit 30, an anode gas supply and discharge circulation unit 50, and a cooling medium supply unit 70.

The controller 10 is configured by a micro-computer having a central processing unit and a main storage unit, and the controller 10 demonstrates various functions by reading and executing programs on the main storage unit. During the operation of the fuel cell system 10, the controller 10 executes an operation control of the fuel cell 20 by controlling each configuring portion described below, and generates electric power in accordance with an output request to the fuel cell 20. The controller 10 further has a function of executing an exhaust gas control for controlling a decline in the system starting performance as a result of freezing of the moisture vapor included in the exhaust gas of the fuel cell 20. In addition, the controller 10 has a function of a pump temperature acquirer 15 for acquiring a pump temperature, which is a parameter expressing the temperature of the hydrogen pump 64 during exhaust gas control. The exhaust gas control, and the processing executed by the pump temperature acquirer 15 during the exhaust gas control are described later.

The fuel cell 20 is a polymer electrolyte fuel cell that generates power by receiving a supply of hydrogen (anode gas) and air (cathode gas) as the reaction gas. The fuel cell 20 has a stacked structure in which a plurality of unit cells 21 are stacked. Each unit cell 21 is a power-generating element that generates power individually, and includes a membrane electrode assembly that is a power generator in which electrodes are arranged on both surfaces of an electrolyte film, and two separators (not shown in the figure) that sandwich the membrane electrode assembly. The electrolyte film is configured by a solid polymer thin film showing excellent proton conductivity in the wet state when moisture is contained inside it.

The cathode gas supply and discharge unit 30 has a function of supplying cathode gas to the fuel cell 20, and a function of discharging the cathode exhaust gas and drainage that are discharged from the cathode of the fuel cell 20 to outside the fuel cell system 100. The cathode gas supply and discharge unit 30 includes a cathode gas pipe 31, an air compressor 32, an air flowmeter 33, and an on-off valve 34 at the upstream side of the fuel cell 20. The cathode gas pipe 31 is connected to an inlet of the gas flow path at the cathode-side of the fuel cell 20. The air compressor 32 is connected to the fuel cell 20 via the cathode gas pipe 31, and supplies the air, which is incorporated from outside and is compressed, to the fuel cell 20 as the cathode gas.

The air flowmeter 33 measures the amount of outside air incorporated by the air compressor 32 at the upstream side of the air compressor 32, and sends the measured value to the controller 10. By driving the air compressor 32 on the basis of the measured value, the controller 10 controls the amount of supply of air to the fuel cell 20. The on-off valve 34 is provided between the air compressor 32 and the fuel cell 20. The on-off valve 34 is normally in a closed state, and opens when air is supplied at a predetermined pressure to the cathode gas pipe 31 from the air compressor 32.

The cathode gas supply and discharge unit 30 includes a cathode exhaust gas pipe 41, a pressure-regulating valve 43, and a pressure measurement portion 44 at the downstream-side of the fuel cell 20. The cathode exhaust gas pipe 41 is connected to an outlet of the gas flow path at the cathode-side of the fuel cell 20, and leads the cathode exhaust gas and the drainage to be discharged outside the fuel cell system 100. The pressure-regulating valve 43 adjusts the pressure of the cathode exhaust gas in the cathode exhaust gas pipe 41. That is, the pressure-regulating valve 43 adjusts the back pressure at the cathode-side of the fuel cell 20. The pressure measurement portion 44 is provided at the upstream side of the pressure-regulating valve, measures the pressure of the cathode exhaust gas, and sends the measured value to the controller 10. The controller 10 adjusts the opening of the pressure-regulating valve 43 on the basis of the measured value of the pressure measurement portion 44.

The anode gas supply and discharge circulation unit 50 has a function of supplying anode gas to the fuel cell 20. Moreover, the anode gas supply and discharge circulation unit 50 has a function of discharging the anode exhaust gas and the drainage that are discharged from the anode of the fuel cell 20 to the outside of the fuel cell system 100, and a function of circulating the anode gas inside the fuel cell system 100. The anode gas supply and discharge circulation unit 50 corresponds to a subordinate concept of the exhaust gas processing unit in the present invention. Hereinafter, the anode exhaust gas flows into the anode gas supply and discharge circulation unit 50, and each configuring portion configuring the flow path of the anode exhaust gas is also called a "exhaust gas flow path configuring portion". Specifically, each pipe 51, 61, and 63 of the anode gas supply and discharge circulation unit 50, which are described later, the gas-liquid separator 62, and the hydrogen pump 64 are included in the exhaust gas flow path configuring portion of the anode gas supply and discharge circulation unit 50. It must be noted that in addition to the components described below, a filter portion and a valve through which the anode exhaust gas flows in may also be provided in the anode gas supply and discharge circulation unit 50, as gas flow path configuring portions.

The anode gas supply and discharge circulation unit 50 includes an anode gas pipe 51, a hydrogen tank 52, an on-off valve 53, a regulator 54, a hydrogen supply apparatus 55, and a pressure measurement portion 56 at the upstream side of the fuel cell 20. High-pressure hydrogen is filled in the hydrogen tank 52 for supply to the fuel cell 20. The hydrogen tank 52 is connected to the inlet of the gas flow path at the anode-side of the fuel cell 20 via the anode gas pipe 51.

The on-off valve 53, the regulator 54, the hydrogen supply apparatus 55, and the pressure measurement portion 56 are provided, in this order, in the anode gas pipe 51 from the hydrogen tank 52-side, which is the upstream-side. By controlling the opening and closing of the on-off valve 53, the controller controls the inflow of hydrogen from the hydrogen tank 52 to the upstream-side of the hydrogen supply apparatus 55. The regulator 54 is a pressure-reducing valve for adjusting the pressure of hydrogen at the upstream side of the hydrogen supply apparatus 55, and the opening thereof is controlled by the controller 10. The hydrogen supply apparatus 55, for example, is configured by an injector, which is a solenoid operated on-off valve. The pressure measurement portion 56 measures the pressure of hydrogen at the downstream-side of the hydrogen supply apparatus 55, and sends the measured value to the controller 10. By controlling the drive cycle that expresses the opening and closing timing of the hydrogen supply apparatus 55 on the basis of the measured value of the pressure measurement portion 56, the controller 10 controls the amount of hydrogen supplied to the fuel cell 20.

The anode gas supply and discharge circulation unit 50 includes an anode exhaust gas pipe 61, a gas-liquid separator 62, an anode gas circulation pipe 63, a hydrogen pump 64, an anode drainage pipe 65, and a drain valve 66 at the downstream-side of the fuel cell 20. The anode exhaust gas pipe 61 is connected to the outlet at the anode-side of the fuel cell 20, and the gas-liquid separator 62.

The gas-liquid separator 62 is connected to the anode gas circulation pipe 63 and the anode drainage pipe 65. The anode exhaust gas that flows into the gas-liquid separator 62 through the anode exhaust gas pipe 61 is separated into the gas component and the water component by the gas-liquid separator 62. In the gas-liquid separator 62, the gas component of the anode exhaust gas is channeled into the anode gas circulation pipe 63, and the water component is channeled into the anode drainage pipe 65.

The anode gas circulation pipe 63 is connected downstream from the hydrogen supply apparatus 55 of the anode gas pipe 51. The hydrogen pump 64 is provided in the anode gas circulation pipe 63. The hydrogen pump 64 functions as a circulation pump that feeds the hydrogen included in the gas component separated in the gas-liquid separator 62 to the anode gas pipe 51. The hydrogen pump 64 includes an encoder 64e. The controller 10 may acquire the actual measured value of the rotation speed of the hydrogen pump 64 during driving by the encoder 64e. The controller 10 performs feedback control of the rotation speed of the hydrogen pump 64 on the basis of the target rotation speed and the actual measured value of the rotation speed of the hydrogen pump 64. Moreover, the pump temperature acquirer 15 of the controller 10 uses the actual measured value of the rotation speed of the hydrogen pump 64 for acquiring the pump temperature as described later.

The drain valve 66 is provided in the anode drainage pipe 65. The drain valve 66 opens and closes under the control of the controller 10. The controller 10 normally keeps the drain valve 66 in the closed position, and opens the drain valve 66 at a predetermined drainage timing, or at a discharge timing of the inert gas present in the anode exhaust gas. The predetermined drainage timing and the discharge timing of the inert gas are set in advance. The downstream end of the anode drain pipe 65 mixes the anode-side waste water and the anode exhaust gas with the cathode-side waste water and the cathode exhaust gas and merges them into the cathode exhaust gas pipe 41 so that they may be discharged (not shown in the drawing).

The cooling medium supply unit 70 includes a cooling medium pipe 71, a radiator 72, a circulation pump 75, and two temperature measurement portions 76a and 76b. The cooling medium pipe 71 is a pipe for circulating the cooling medium for cooling the fuel cell 20, and is configured by an upstream-side pipe 71a and a downstream-side pipe 71b. The upstream-side pipe 71a connects the outlet of the cooling medium flow path inside the fuel cell 20 and the inlet of the radiator 72. The downstream-side pipe 71b connects the inlet of the cooling medium flow path inside the fuel cell 20 and the outlet of the radiator 72.

The radiator 72 has a fan for pulling in outside air, which cools the cooling medium through heat exchange between the cooling medium pipe 71 and the outside air. The circulation pump 75 is provided in the downstream-side pipe 71b, and is driven on the basis of an instruction from the controller 10. The cooling medium flows inside the cooling medium pipe 71 because of the driving power of the circulation pump 75.

The first temperature measurement portion 76a is provided in the upstream-side pipe 71a, and the second temperature measurement portion 76b is provided in the downstream-side pipe 71b. In the present embodiment, the controller 10 detects the cooling medium temperature in each pipe 71a and 71b by the two temperature measurement portions 76a and 76b, and detects the temperature of the fuel cell 20 from the cooling medium temperature of each pipe 71a and 71b. The controller 10 controls the temperature of the fuel cell 20 by controlling the rotation speed of the circulation pump 75 on the basis of the temperature of the fuel cell 20. The temperature of the fuel cell 20 that is acquired by the two temperature measurement portions 76a and 76b, is used for the exhaust gas control by the controller 10, and the acquisition of the pump temperature by the pump temperature acquirer 15 as described later. The two temperature measurement portions 76a and 76b correspond to a subordinate concept of the temperature acquirer in the present invention. However, the second temperature measurement portion 76b may be omitted, and the temperature of the fuel cell 20 may be detected by only the measured value of the first temperature measurement portion 76a.

In addition, the fuel cell system 100 includes a secondary cell and a DC/DC converter (not shown in the drawing). The secondary cell stores the electric power or regenerative power output by the fuel cell 20, and functions as a power source together with the fuel cell 20. The DC/DC converter may control the charging and discharging of the secondary cell, and the output voltage of the fuel cell 20.

A2. Operation Control During Start-Up of the Fuel Cell System

Figure 2:
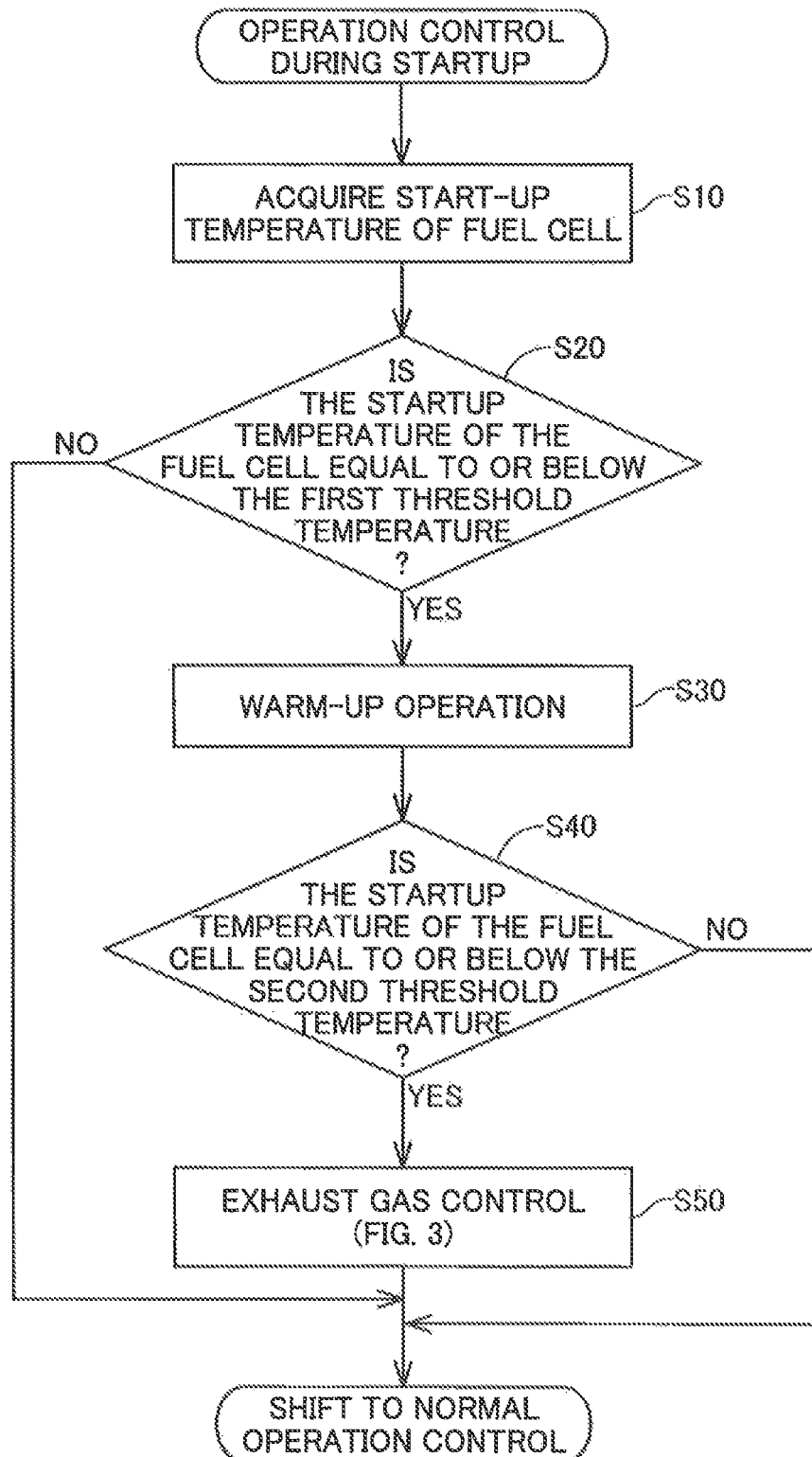
FIG. 2 is an explanatory diagram showing a flow of an operation control during start-up of a fuel cell system.

FIG. 2 is an explanatory diagram showing a flow of an operation control during start-up of the fuel cell system. The fuel cell system 100 starts when the ignition ON operation of the fuel cell vehicle is performed by the driver. When the fuel cell system 100 starts up, the supply of the reaction gas to the fuel cell 20 is started by the cathode gas supply and discharge unit 30 and the anode gas supply and discharge circulation unit 50 under the control of the controller 10 and the generation of power in the fuel cell 20 is started. The controller 10 executes the operation control described below.

In step S10, the controller 10 acquires the current temperature of the fuel cell, that is, the temperature of the fuel cell 20 at the time of its start-up (start-up temperature) on the basis of the measurement result of the two temperature measurement portions 76a and 76b of the cooling medium supply unit 70. When the start-up temperature of the fuel cell 20 is above a first predetermined threshold temperature, the controller 10 decides that warming up of the fuel cell 20 is not necessary, and shifts to the normal operation control directly as shown by the NO arrow of step S20. For example, the first predetermined threshold temperature may be 5 to 10° C. The first threshold temperature may be a temperature that is experimentally determined beforehand as a temperature close to the ice point that is fraught with the possibility of freezing of moisture inside the fuel cell 20.

On the other hand, when the start-up temperature of the fuel cell 20 is equal to or below the first predetermined threshold temperature, then as shown by the YES arrow of step S20, the controller 10 decides that warming up of the fuel cell 20 is necessary, and thus, starts the warm-up operation of the fuel cell 20 in step S30. During the warm-up operation of the fuel cell 20, the controller 10 reduces the amount of supply of the cathode gas to the fuel cell 20 with respect to the amount of supply of the anode gas. As a result, the power generation efficiency of the fuel cell 20 declines and the calorific value of the fuel cell 20 increases, which enables rapid temperature rise of the fuel cell 20.

During the warm-up operation, the controller 10 drives the hydrogen pump 64 at a rotation speed that is less than the minimum rotation speed assumed during the exhaust gas control described later. The rotation speed at this time may be a rotation speed at which the moisture at the anode-side that occurs during the warm-up operation is transferred to the downstream side from the hydrogen pump 64. As a result, freezing of the drainage retained during the warm-up operation is prevented. The controller 10 continues with the warm-up operation of step S30 until the temperature of the fuel cell 20 reaches a predetermined temperature. For example, the predetermined temperature may be a temperature of around 45 to 55° C.

In step S40, the controller 10 determines whether or not the start-up temperature of the fuel cell 20 acquired in step S10 is equal to or below a second predetermined threshold temperature that is less than the first threshold temperature. The second threshold temperature may be a temperature that is experimentally determined beforehand as a temperature at which the temperature of the exhaust gas flow path configuring portion in the anode gas supply and discharge circulation unit 50 after the warm-up operation possibly stays below the ice point. For example, the second predetermined threshold temperature may be 0 to 5° C. The judgment process of step S40 may be executed before the warm-up operation of step S30.

When the start-up temperature of the fuel cell 20 is higher than the second threshold temperature, the controller 10 shifts to the normal operation control after the warm-up operation of the fuel cell 20 ends as shown by the NO arrow in step S40. On the other hand, when the temperature of the fuel cell 20 is equal to or below the second threshold temperature, as shown by the YES arrow in step S40, the controller 10 starts the exhaust gas control described below while continuing with the warm-up operation of the fuel cell 20 in step S50.

Figure 3:
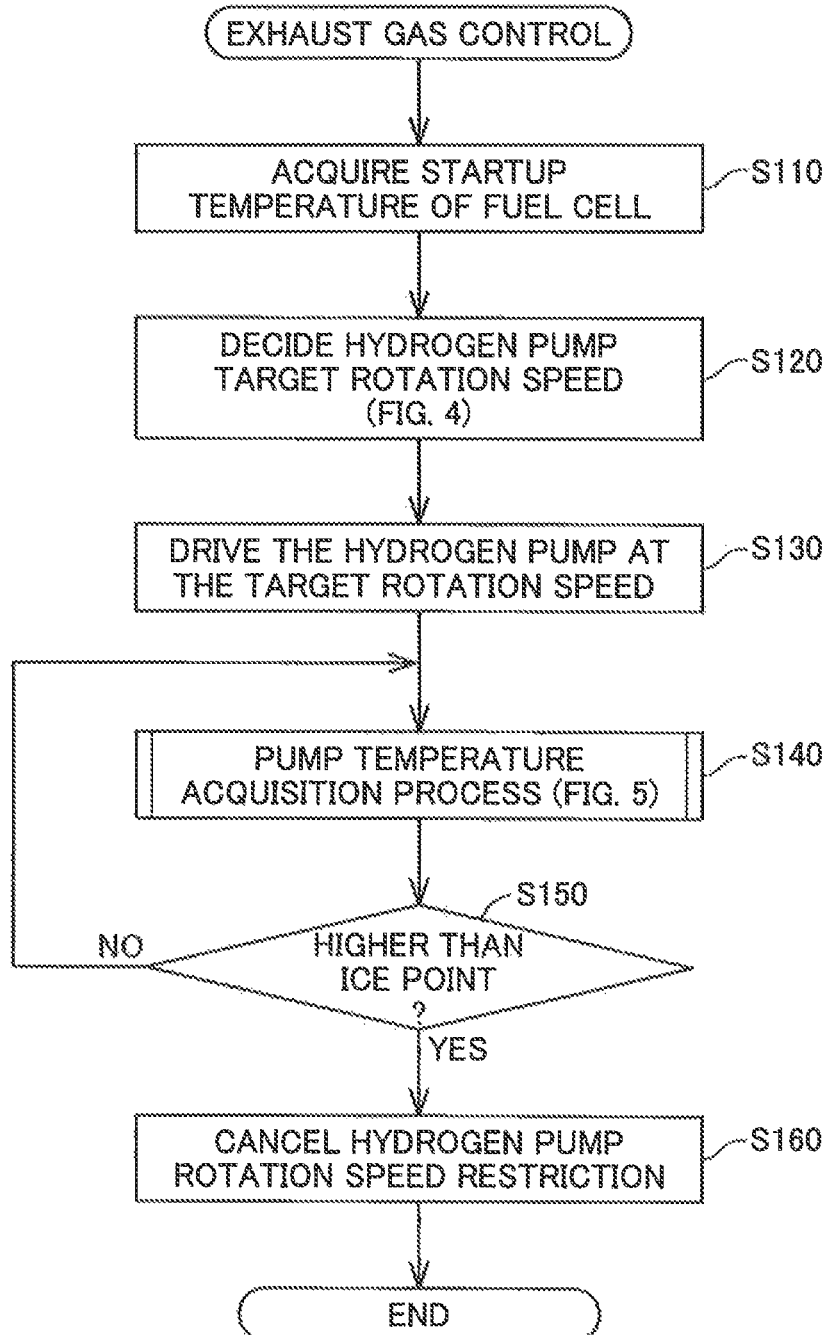
FIG. 3 is an explanatory diagram showing a flow of exhaust gas control.

FIG. 3 is an explanatory diagram showing a flow of exhaust gas control. In step S110, the controller 10 acquires the start-up temperature of the fuel cell 20 on the basis of the measured value of the two temperature measurement portions 76a and 76b of the cooling medium supply unit 70 as the temperature that expresses the temperature during start-up of the fuel cell system 100 of the exhaust gas flow path configuring portion in the anode gas supply and discharge circulation unit 50. The controller 10 may use the start-up temperature of the fuel cell 20 acquired in step S10 in FIG. 2 as is. The process of step S110 corresponds to a subordinate concept of the temperature acquisition step in the present embodiment. In step S120, the controller 10 decides the target rotation speed of the hydrogen pump 64 on the basis of the start-up temperature of the fuel cell 20 acquired in step S110 with reference to an already prepared map.

Figure 4:
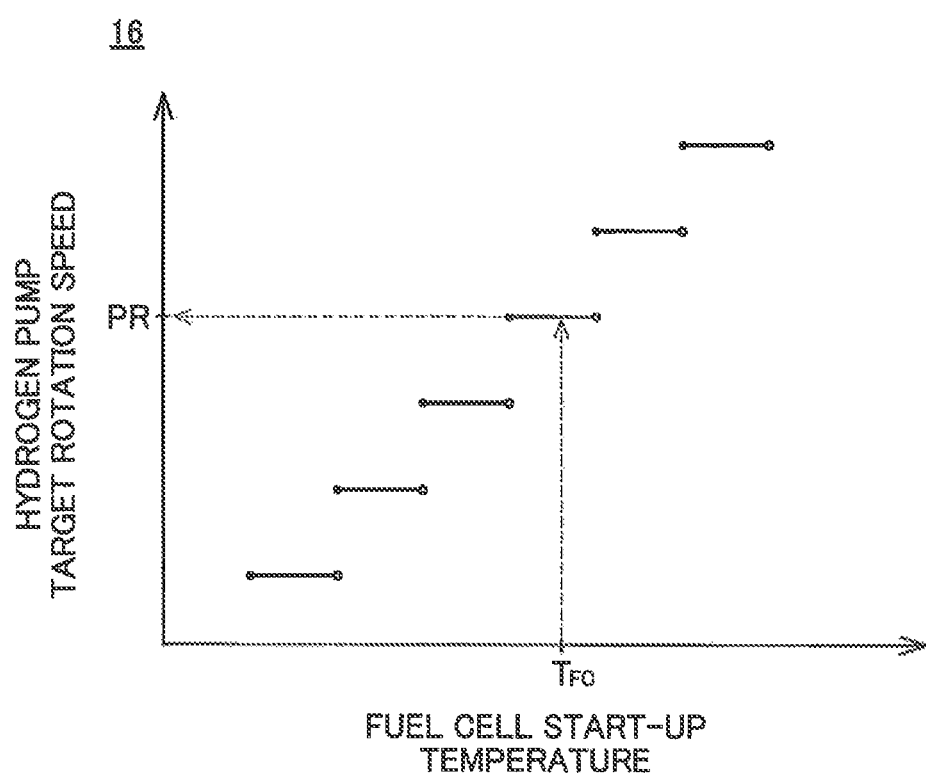
FIG. 4 is an explanatory diagram showing an example of a pump rotation speed map.

FIG. 4 is an explanatory diagram showing an example of a map used for deciding the rotation speed of the hydrogen pump 64 in step S120. Hereinafter, the map 16 called the "pump rotation speed map 16". In a relationship set in the pump rotation speed map 16, the target rotation speed of the hydrogen pump 64 increases step-wise according to the increase of the start-up temperature of the fuel cell 20. In the pump rotation speed map 16, a value of the target rotation speed of the hydrogen pump 64 corresponding to the start-up temperature of the fuel cell 20 is decided as described below.

Figure 5:
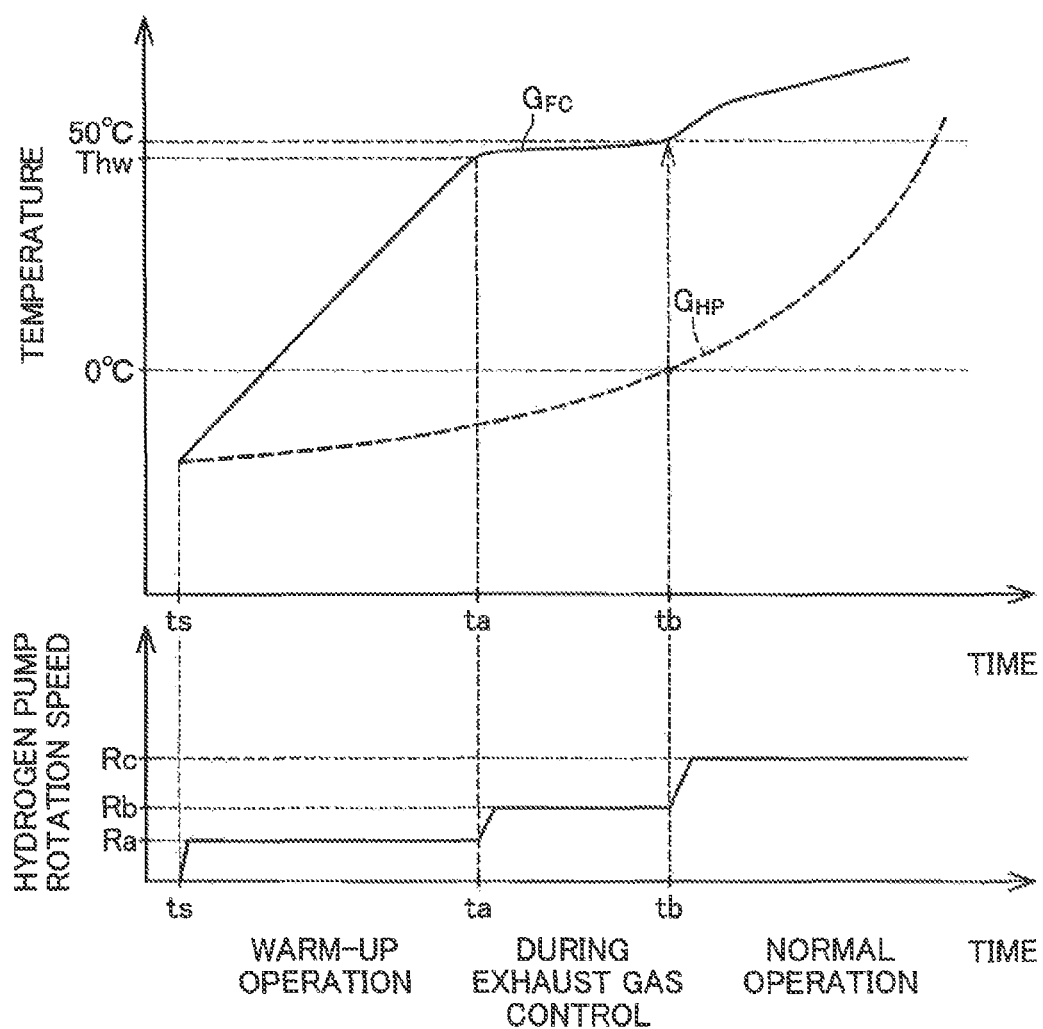
FIG. 5 is an explanatory diagram showing an example of temporal changes of a temperature of a fuel cell and a temperature of a hydrogen pump during start-up below ice point, and an example of temporal changes of a rotation speed of the hydrogen pump.

The upper part of FIG. 5 illustrates a graph showing the temporal changes of the temperature of the fuel cell 20 and the temperature of the hydrogen pump 64 when the warm-up operation is performed in the fuel cell 20 after starting up the fuel cell system 100 below the ice point. The solid line graph $G_{FC}$ shows the temporal changes of the temperature of the fuel cell 20, and the broken line graph $G_{HP}$ shows the temporal changes of the temperature of the hydrogen pump 64.

When the fuel cell system 100 is started at time ts after allowing to stand for some time below the ice point, the temperature of the fuel cell 20 and the temperature of the hydrogen pump 64 are almost the same, and there is a possibility of freezing of the hydrogen pump 64. When the warm-up operation of the fuel cell 20 is started, the frozen hydrogen pump 64 is warmed up and defrosted as a result of the heat received from the moisture vapor, which is included in the anode exhaust gas discharged from the fuel cell 20. However, the temperature rise of the hydrogen pump 64 is delayed as compared to the fuel cell 20, and when the temperature of the fuel cell 20 reaches approximately 50° C. as a result of the warm-up operation, the temperature of the hydrogen pump 64 exceeds ice point finally.

If a large amount of moisture vapor flows into the hydrogen pump 64 when the internal temperature of the hydrogen pump 64 is below the ice point, the water vapor condenses and freezes inside the hydrogen pump 64, and the rotor of the hydrogen pump 64 may be locked. Moreover, in the exhaust gas flow path configuring portions other than the hydrogen pump 64, various problems, such as clogging of the filter, locking of the valve and clogging of the exhaust path, may occur even as a result of freezing of the moisture vapor. The moisture vapor content included in the anode exhaust gas is decided by the saturated moisture vapor content with respect to the temperature of the fuel cell 20, and the flow of the anode exhaust gas is decided by the rotation speed of the hydrogen pump 64. That is, the moisture vapor content flowing into the hydrogen pump 64 is decided by the temperature of the fuel cell 20 and the rotation speed of the hydrogen pump 64.

In the pump rotation speed map 16 shown in FIG. 4 in the present embodiment, a permissible value of the rotation speed of the hydrogen pump 64 corresponding to the start-up temperature of the fuel cell 20 is set. The permissible value of the rotation speed of the hydrogen pump 64 is a value that allows raise the temperature of the hydrogen pump 64 without causing the freezing of the moisture vapor inside the hydrogen pump 64. Therefore, if the hydrogen pump 64 is started at the target rotation speed obtained on the basis of the pump rotation speed map 16, the amount of heat necessary for defrosting of the hydrogen pump 64 is obtained from the moisture vapor included in the anode exhaust gas, and at the same time, the freezing of the moisture vapor inside the hydrogen pump 64 is prevented.

In step S130 shown in FIG. 3, the controller 10 starts the drive of the hydrogen pump 64 at the target rotation speed PR of the hydrogen pump 64 that is decided with respect to the start-up temperature $T_{FC}$ of the fuel cell 20 based on the pump rotation speed map 16. The target rotation speed PR is a value lower than the rotation speed of the hydrogen pump 64 during the normal operation control. Therefore, it may be interpreted that during the time the hydrogen pump 64 is being driven at the target rotation speed PR, the flow rate of the anode exhaust gas flowing into the exhaust gas flow path configuring portion in the anode gas supply and discharge circulation unit 50 including the hydrogen pump 64 from the fuel cell 20 is restricted. That is, the process of steps S120 and S130 corresponds to a subordinate concept of the exhaust gas control step in the present invention, and the exhaust gas control according to the present embodiment corresponds to the exhaust gas control step in the present invention and a subordinate concept of the flow restriction control.

In step S140, the pump temperature acquirer 15 calculates the pump temperature, which is an estimated value of the current temperature of the hydrogen pump 64, by the pump temperature acquisition process which is described later, on the basis of the actual measured value of the current rotation speed of the hydrogen pump 64. The controller 10 continues with the driving of the hydrogen pump 64 at the target rotation speed PR until the pump temperature obtained by the pump temperature acquirer 15 becomes higher than the ice point as shown by the NO arrow of step S150. During the time the driving of the hydrogen pump 64 continues at the target rotation speed PR, the pump temperature acquisition process by the pump temperature acquirer 15 of step S140 is repeated at a predetermined control cycle, and the pump temperature is sequentially updated.

When the pump temperature becomes higher than the ice point, as shown by the YES arrow of step S150, the controller 10 ends the driving at the target rotation speed PR of the hydrogen pump 64 in step S160. That is, the controller 10 cancels the restriction on the rotation speed of the hydrogen pump 64, and returns the rotation speed of the hydrogen pump 64 to the rotation speed during normal operation control. Step S160 corresponds to a subordinate concept of the restriction cancellation step in the present invention.

The lower part of FIG. 5 illustrates an example of a graph showing the temporal changes of the rotation speed of the hydrogen pump 64 during the start-up of the fuel cell system 100 in a low-temperature environment. The time axis of the graph shown in the lower part of FIG. 5 corresponds to the time axis of the graph shown in the above-described upper part. If the fuel cell system 100 is started at time ts and the warm-up operation is started, the controller 10 drives the hydrogen pump 64 at a rotation speed Ra that is lower than that during the execution of exhaust gas control and during normal operation. If the temperature of the fuel cell 20 reaches the end threshold Thw of the warm-up operation in time ta, and the fuel cell 20 shifts to exhaust gas control, the controller 10 drives the hydrogen pump 64 at a rotation speed Rb that is lower than that during the normal operation. After the temperature of the hydrogen pump 64 reaches to the ice point in time tb, and the fuel cell 20 ends the exhaust gas control and shifts to the normal operation control, the controller 10 drives the hydrogen pump 64 at a predetermined rotation speed Rc.

In this way, in the fuel cell system 100 in the present embodiment, until the temperature of the hydrogen pump 64 exceeds the ice point, the rotation speed of the hydrogen pump 64 is restricted, and the amount of moisture vapor flowing into the hydrogen pump 64 and other exhaust gas flow path configuring portions is restricted. Therefore, locking of the hydrogen pump 64 due to freezing of the moisture vapor, and other problems occurring due to freezing of the moisture vapor, such as closing of the exhaust gas flow path in the exhaust gas flow path configuring portions is suppressed. Moreover, if the temperature of the hydrogen pump 64 exceeds the ice point, the restriction on the rotation speed of the hydrogen pump 64 is cancelled immediately, because of which the decline in system efficiency as a result of restriction on the rotation speed of the hydrogen pump 64 is suppressed.

Figure 6:
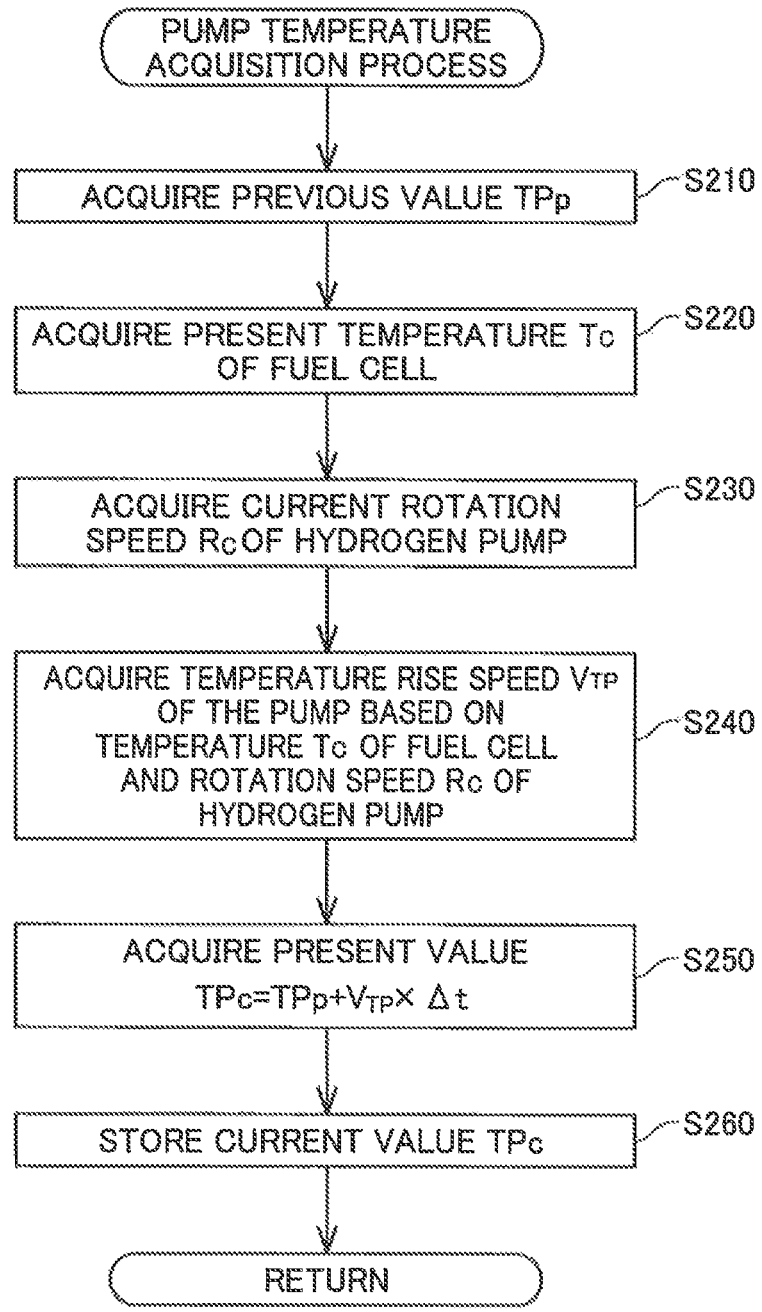
FIG. 6 is an explanatory diagram showing a flow of a pump temperature acquisition process.

FIG. 6 is an explanatory diagram showing a flow of the pump temperature acquisition process executed by the pump temperature acquirer 15. As described above, the pump temperature acquisition process is repeated at a predetermined control cycle during the time the rotation speed of the hydrogen pump 64 is restricted. The pump temperature acquisition process corresponds to a subordinate concept of flow path temperature acquisition step in the present invention, and the pump temperature acquirer 15 corresponds to a subordinate concept of the flow path temperature acquirer in the present invention.

In step S210, the pump temperature acquirer 15 reads and acquires a previous value TPp stored in a storage portion which is not shown in the drawing. When the pump temperature acquisition process is executed for the first time, the pump temperature acquirer 15 reads the temperature of the fuel cell 20 acquired in step S110 shown in FIG. 3 as the initial value of the previous value TPp. As the initial value of the previous value TPp, the correlation between the temperature variation of the fuel cell 20 and the temperature variation of the hydrogen pump 64 when kept in a low-temperature environment may be obtained beforehand through such as an experiment, and the value obtained on the basis of this correlation may be used.

In step S220, the pump temperature acquirer 15 acquires the current temperature $T_C$ of the fuel cell 20 on the basis of the measured value of the two temperature measurement portions 76a and 76b of the cooling medium supply unit 70. In step S230, the pump temperature acquirer 15 acquires the current rotation speed $R_c$ of the hydrogen pump 64 by the encoder 64e of the hydrogen pump 64.

In step S240, the pump temperature acquirer 15 acquires the temperature rise speed $V_{TP}$ of the hydrogen pump 64 on the basis of the current temperature $T_C$ of the fuel cell 20, and the current rotation speed $R_C$ of the hydrogen pump 64 by using a map prepared in advance. The "temperature rise speed of the hydrogen pump 64" is the amount of increase in temperature of the hydrogen pump 64 per unit time.

Figure 7:
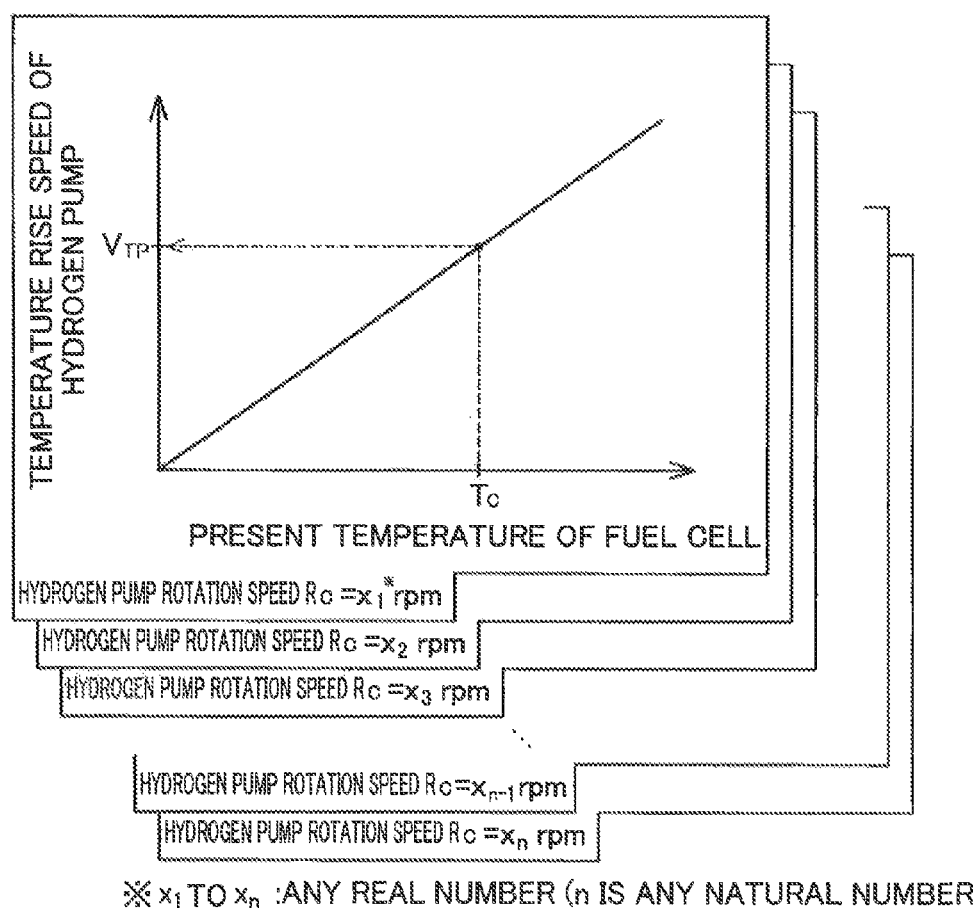
FIG. 7 is an explanatory diagram showing an example of a temperature rise speed map.

FIG. 7 is an explanatory diagram that conceptually shows an example of a map used for acquiring the temperature rise speed $V_{TP}$ of the hydrogen pump 64 in step S240. Hereinafter, the map 18 is called the "temperature rise speed map 18". In the temperature rise speed map 18, relationships where a higher value of the temperature rise speed of the hydrogen pump 64 is obtained as the temperature of the fuel cell 20 is high are set for each values of the rotation speed of the hydrogen pump 64.

In the present embodiment, the temperature rise speed of the hydrogen pump 64 in the temperature rise speed map 18 is a value calculated on the basis of the flow rate of the anode exhaust gas that is decided by the rotation speed of the hydrogen pump 64, and the amount of heat received by the hydrogen pump 64 from the anode exhaust gas including the moisture vapor of the saturated moisture vapor content. The controller 10 acquires the temperature rise speed $V_{TP}$ of the hydrogen pump 64 with respect to the current temperature $T_C$ of the fuel cell 20 on the basis of the relationship between the temperature of the fuel cell 20 corresponding to the current rotation speed $R_C$ of the hydrogen pump 64 and the temperature rise speed of the hydrogen pump 64.

In step S250 in FIG. 6, the pump temperature acquirer 15 multiplies a very small amount of time $\Delta t$ corresponding to the control cycle with the temperature rise speed $V_{TP}$ of the hydrogen pump 64, and then by adding the previous value TPp, calculates the present value TPc of the pump temperature as shown by the Expression (A) below.

$$TPc = TPp + V_{TP} \times \Delta t \quad\quad\quad (A)$$

In step S260, the pump temperature acquirer 15 stores the current value TPc in the storage portion. The pump temperature acquirer 15 reads the present value TPc stored in the storage portion as the previous value TPp in step S210 of the pump temperature acquisition process of the next cycle.

According to the pump temperature acquisition process of the present embodiment, the pump temperature that expresses the current temperature of the hydrogen pump 64 is calculated accurately by a simple calculation on the basis of the temperature of the fuel cell 20 and the rotation speed of the hydrogen pump 64. Therefore, the temperature sensor and measurement process for the direct measurement of the temperature of the hydrogen pump 64 may be omitted, which results in improved efficiency.

A3. Conclusion

As described above, according to the fuel cell system 100 in the present embodiment, during start-up in a low-temperature environment, the inflow of excessive moisture vapor into the exhaust gas flow path configuring portions in the anode gas supply and discharge circulation unit 50 including the hydrogen pump 64 is suppressed. Therefore, the occurrence of problems in the exhaust gas flow path configuring portions owing to freezing of moisture vapor is suppressed. Moreover, an inflow amount of moisture vapor that enables defrosting of the exhaust gas flow path configuring portions including the hydrogen pump 64 is secured, which facilitates starting performance of the hydrogen pump 64, as well as starting performance of the anode gas supply and discharge circulation unit 50. Therefore, the decline in the starting performance of the fuel cell system 100 in a low-temperature environment is suppressed.

B. Modifications

B1. Modification 1:

In the above-described embodiment, the target rotation speed of the hydrogen pump 64 with respect to the temperature of the fuel cell 20 is decided on the basis of the pump rotation speed map 16. In contrast, the target rotation speed of the hydrogen pump 64 may not be decided on the basis of the pump rotation speed map 16. The target rotation speed of the hydrogen pump 64 may be set such that the flow rate of the exhaust gas flowing into the exhaust gas flow path configuring portions in the anode gas supply and discharge circulation unit 50 is restricted more than during the normal operation. The target rotation speed of the hydrogen pump 64 may not be set in accordance with the temperature of the fuel cell 20, and may be set to a predetermined rotation speed that is lower than that during normal operation control. Moreover, as shown in FIG. 4, in the pump rotation speed map 16, the relationship according to which the target rotation speed of the hydrogen pump 64 increases step-wise if the temperature of the fuel cell 20 is large enough may not be set, and a relationship according to which the target rotation speed of the hydrogen pump 64 changes in a linear or curved manner with respect to the temperature of the fuel cell 20 may be set.

B2. Modification 2:

In the exhaust gas control according to the above-described embodiment, the amount of anode exhaust gas flowing into the exhaust gas flow path configuring portions of the anode gas supply and discharge circulation unit 50 is restricted. In contrast, in the exhaust gas control, the amount of cathode exhaust gas flowing into the exhaust gas flow path configuring portions configuring the flow path of the cathode exhaust gas in the cathode gas supply and discharge circulation unit 30 may be restricted.

B3. Modification 3:

In the exhaust gas control according to the above-described embodiment, the flow rate of the anode exhaust gas flowing into the exhaust gas flow path configuring portions is adjusted by the rotation speed of the hydrogen pump 64. In contrast, the flow rate of the anode exhaust gas flowing into the exhaust gas flow path configuring portions may not be adjusted by the rotation speed of the hydrogen pump 64. The flow rate of the anode exhaust gas flowing into the exhaust gas flow path may be adjusted by a valve such as a pressure-regulating valve, or the flow rate of the anode exhaust gas may be adjusted by bifurcating some of the anode exhaust gas to another location. Moreover, in the exhaust gas control, the moisture vapor content flowing into the exhaust gas flow path configuring portions along with the anode exhaust gas may be restricted by restricting the rise in the temperature of the fuel cell 20. Specifically, the operating temperature of the fuel cell 20 is restricted to a value below the normal operating temperature by controlling the opening of a valve, such as the rotary valve provided in the cooling medium flow path of the cooling medium supply unit 70. For example, if the normal operating temperature is around 80° C., it is restricted by the temperature of approximately 80-90%, that is, to around 60 to 70° C. As a result, the temperature of the exhaust gas drops, and the moisture vapor pressure of the exhaust gas may be reduced. Therefore, the moisture vapor content flowing into the exhaust gas flow path configuring portions may be restricted, and same as the exhaust gas control explained above in each embodiment, the freezing of the exhaust gas flow path configuring portions due to the moisture vapor may be prevented. The process of restricting the operating temperature of the fuel cell 20 may also be executed in combination with the process of restricting the rotation speed of the hydrogen pump 64. As a result, the freezing of the exhaust gas flow path configuring portions is prevented more effectively.

B4. Modification 4:

In the above-described embodiments, the pump temperature that expresses the temperature of the hydrogen pump 64 is acquired by the pump temperature acquisition process that is executed sequentially. In contrast, the pump temperature that expresses the temperature of the hydrogen pump 64 may be acquired by directly measuring the temperature of the hydrogen pump 64 by a temperature sensor or the like. Alternatively, a new pump temperature may be acquired each time the pump temperature acquisition process is executed by using a map based on the relationship between an already-prepared temperature of the fuel cell 20 and the pump temperature.

B5. Modification 5:

In the above-described embodiments, the exhaust gas control is executed when the temperature of the fuel cell 20 is below the second threshold temperature in step S40 shown in FIG. 2. In contrast, the execution of the exhaust gas control may be started even when the temperature of the fuel cell 20 is not below the second threshold temperature.

B6. Modification 6:

In the above-described embodiments, the restriction on the rotation speed of the hydrogen pump 64 is canceled when the pump temperature breaks through the ice point. In contrast, the restriction on the rotation speed of the hydrogen pump 64 may be canceled when the pump temperature reaches another temperature. The controller 10 may, for example, cancel the restriction on the rotation speed of the hydrogen pump 64 when a predetermined time period has elapsed, regardless of the pump temperature.

B7. Modification 7:

In the above-described embodiments, the exhaust gas control is executed in parallel when the warm-up operation of the fuel cell 20 is being performed. In contrast, the warm-up operation of the fuel cell 20 may be omitted, and only the exhaust gas control may be performed in a low-temperature environment.

B8. Modification 8:

The exhaust gas control according to the above-described embodiment is executed with the purpose of controlling the anode gas supply and discharge circulation unit 50 that performs the process of circulating and discharging the anode exhaust gas in the fuel cell system 100. In contrast, the exhaust gas control may be executed with the purpose of controlling the exhaust gas processing unit that performs a process other than circulation and discharge of the exhaust gas of the fuel cell 20. The exhaust gas control, for example, may be executed for the exhaust gas processing portion that executes the process of separating hydrogen from the exhaust gas of the fuel cell 20.

The present invention is not restricted to the above-described embodiments, examples, and modifications, and may be implemented in various configurations as long as the jist of the invention is not lost. For example, the technical characteristics described in the embodiments, examples, and modifications corresponding to the technical characteristics in each form described in the SUMMARY OF INVENTION column may be appropriately substituted or combined together in order to resolve some or all of the above-described issues, or to realize some or all of the above-described effects. Moreover, if the technical characteristics are not described as compulsory in the SPECIFICATIONs, they may be deleted appropriately. Moreover, in each of the above-described embodiments and modifications, some or all of the functions and processes implemented by software may be implemented by hardware. Also, some or all of the functions and processes implemented by hardware may be implemented by software. Various types of circuits, such as an integrated circuit, a discrete circuit, or a circuit module that is a combination of these circuits may be used as hardware.

What is claimed is:

1. A fuel cell system, comprising:
a fuel cell;
a temperature acquirer for acquiring a temperature of the fuel cell;
a supplying unit supplying a reaction gas to the fuel cell;
a flow path through which an exhaust gas of the fuel cell flows;
an exhaust gas processing unit including a flow path configuring portion that configures at least a part of the flow path; and
a controller programmed to:
control the supplying unit and the exhaust gas processing unit to control an operation of the fuel cell;
acquire a starting temperature that represents a temperature of the fuel cell at start-up of the fuel cell;
execute a warm-up operation that increases a calorific value of the fuel cell more than a normal operation of the fuel cell when the starting temperature is equal to or below a first predetermined temperature at start-up of the fuel cell;
execute a flow restriction control in the warm-up operation when the starting temperature is not greater than a second predetermined temperature, the second predetermined temperature being lower than the first predetermined temperature; and
execute the flow restriction control after a current temperature of the fuel cell reaches a third predetermined temperature in the warm-up operation,
wherein the flow restriction control restricts a flow rate of the exhaust gas flowing into the flow path configuring portion as compared to the flow rate of the exhaust gas flowing into the flow path configuring portion when the starting temperature is equal to or less than the second predetermined temperature.

2. The fuel cell system according to claim 1, wherein
the controller is programmed to set the flow rate of the exhaust gas flowing in to the flow path configuring portion in accordance with the starting temperature in the flow restriction control.

3. The fuel cell system according to claim 2, wherein
the controller is programmed to:
acquire a permissible value of the flow rate of the exhaust gas for the starting temperature of the fuel cell on the basis of a relationship, which is prepared in advance, between the temperature of the fuel cell and the permissible value, and
set the flow rate of the exhaust gas to the permissible value in the flow restriction control; and wherein
the permissible value is is predetermined on the basis of the amount of moisture vapor included in the exhaust gas at the temperature of the fuel cell.

4. The fuel cell system according to claim 1, further comprising:
a flow path temperature acquirer acquires a value expressing the temperature of the flow path configuring portion; and
the controller is programmed to cancel the restriction on the flow rate of the exhaust gas, when the value expressing the temperature of the flow path configuring portion becomes more than a predetermined value during the flow restriction control.

5. The fuel cell system according to claim 4, wherein
the follow path temperature acquirer acquires the value expressing the temperature of the flow path configuring portion on the basis of the flow rate of the exhaust gas and the temperature of the fuel cell.

6. The fuel cell system according to claim 1, wherein
the exhaust gas processing unit includes a circulation pump as the flow path configuring portion and circulates the exhaust gas to the fuel cell by the circulation pump; and
the controller is programmed to control the flow rate of the exhaust gas by the rotation speed of the circulation pump.

7. The fuel cell system according to claim 1, wherein
the flow rate of the exhaust gas flowing into the flow path configuring portion during the flow restriction control is greater than during the warm-up operation before starting the flow restriction control.

* * * * *